Sept. 29, 1942.  L. A. PARADISE ET AL  2,297,317
HARVESTER-SICKLE DRIVING MEANS
Original Filed July 29, 1940   2 Sheets-Sheet 1

INVENTORS
LOUIS A. PARADISE
RALPH L. ANDERSON
BY
ATTORNEYS

Sept. 29, 1942.　　　L. A. PARADISE ET AL　　　2,297,317
HARVESTER-SICKLE DRIVING MEANS
Original Filed July 29, 1940　　2 Sheets-Sheet 2

INVENTORS
LOUIS A. PARADISE
RALPH L. ANDERSON
BY
ATTORNEYS

Patented Sept. 29, 1942

2,297,317

UNITED STATES PATENT OFFICE 2,297,317

HARVESTER-SICKLE DRIVING MEANS

Louis A. Paradise and Ralph L. Anderson, Moline, Ill., assignors to Deere & Company, Moline, Ill., a corporation of Illinois Original application July 29, 1940, Serial No. 348,128. Divided and this application December 4, 1941, Serial No. 421,566

7 Claims. (Cl. 56—158)

The present invention relates generally to harvesters and more particularly to harvesters of the type having a transversely disposed cutter bar and a sickle adapted to reciprocate in cooperation therewith, and has for its principal object the provision of a novel and improved mechanism for reciprocating the sickle relative to the cutter bar. A more specific object relates to the provision of a power connection for reciprocating the sickle, in which means is incorporated for quickly and easily adjusting the register between the sickle knife blades and the ledger plates of the cutter bar.

This application is a division of an application, Serial No. 348,128, filed July 29, 1940, by Anderson, Arnold and Paradise.

These and other objects and advantages of our invention will be apparent to those skilled in the art after a consideration of the following description in which reference is had to the drawings appended hereto, in which Figure 1 is a perspective view of the forward end of a harvesting machine of the type known as a combine, in which the principles of the present invention are incorporated in the sickle drive mechanism;

Figure 1:
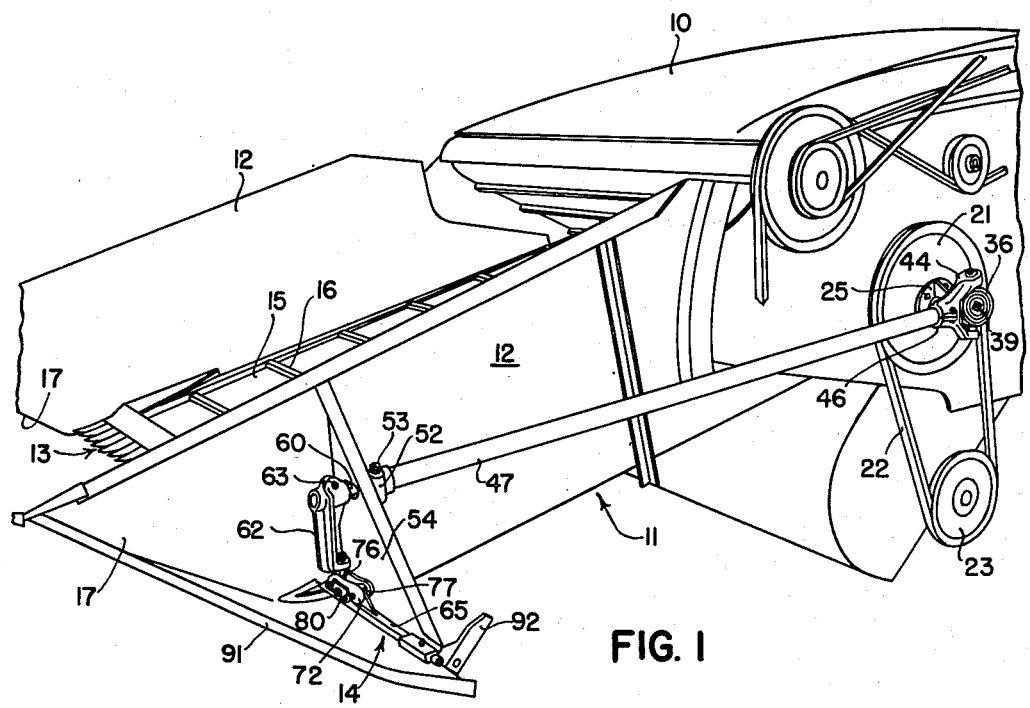

Referring now to the drawings, the combine comprises a longitudinally extending thresher body 10, to the forward end of which is connected a forwardly extending platform 11, by means providing for vertical swinging movement of the platform relative to the body about a transversely extending axis. The platform 11 comprises a forwardly and downwardly extending grain pan having a pair of laterally disposed side walls 12, and carries a transverse cutter bar 13 across the forward edge of the platform. A sickle member indicated generally by reference numeral 14 cooperates with the cutter bar 13 and is reciprocable relative thereto for severing crops from the field, after which the crops fall rearwardly upon an endless canvas conveyor 15 having a plurality of transverse slats 16 fixed thereto. The conveyor 15 conveys the harvested material upwardly and rearwardly from the cutter bar and delivers the material into the forward end of the harvester body 10 in a manner well known to those skilled in the art.

The side walls 12 are each extended forwardly beyond the cutter bar to provide dividers 17.

Figure 6:
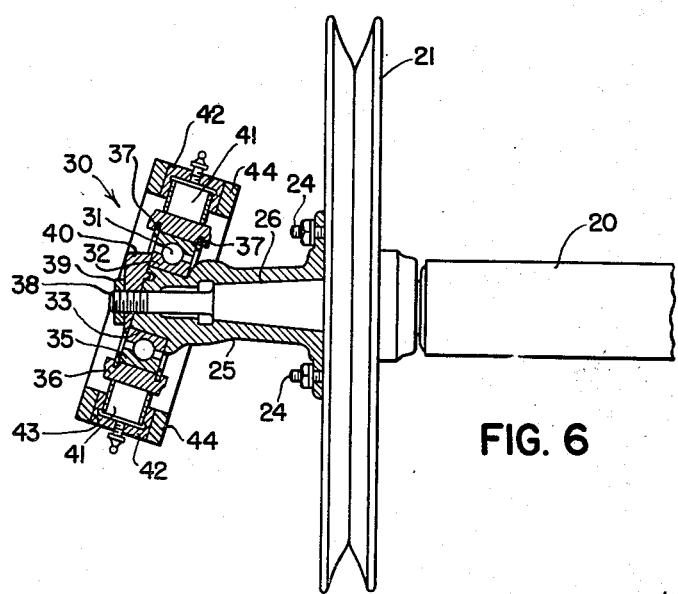
Figure 6 is a vertical sectional view drawn to a still further enlarged scale, and taken through the axis of the driving mechanism.

The upper end of the endless conveyor 15 is trained around a drive roller 20 (see Figure 6), which is journaled for rotation about the axis of vertical swinging movement of the platform 11 relative to the body 10 in a manner which forms no part of this invention but which is fully disclosed in the aforementioned patent application. A V-belt pulley 21 is fixed to the shaft of the roller 20 for driving the latter and receives power through a V-belt 22 which is trained over a second pulley 23, to which power is supplied by any suitable means known to the art. The V-belt pulley 21 is rigidly fixed by bolts 24 to a hub member 25, which is pressed onto the tapered end portion 26 of the shaft of the roller 20.

The harvester sickle 14 is driven from the V-belt pulley 21, which also drives the platform roller 20. The uniform rotation of the pulley 21 is converted into a reciprocating motion by means of a wobble drive mechanism of more or less conventional form, which does not form a part of the present invention, and therefore it is not deemed necessary to describe this wobble motion device in great detail. Briefly, however, the wobble device 30 comprises a ball bearing member 31 including an inner race 32, mounted on a cylindrical surface 33 at the end of the hub 25 but which has an axis of generation disposed at an acute angle to the axis of rotation of the hub. An outer ball race 35 is secured within a ring 36 by means of a pair of annular retaining rings 37, which fit within grooves in the ring 36 on opposite sides of the bearing race 35. The outer end of the shaft is threaded, as at 38, on which is mounted a securing nut 39, which bears against a wedge-shaped washer 40, which abuts the end of the hub 25 and holds the latter in place on the tapered portion 26 of the shaft.

Figure 5:
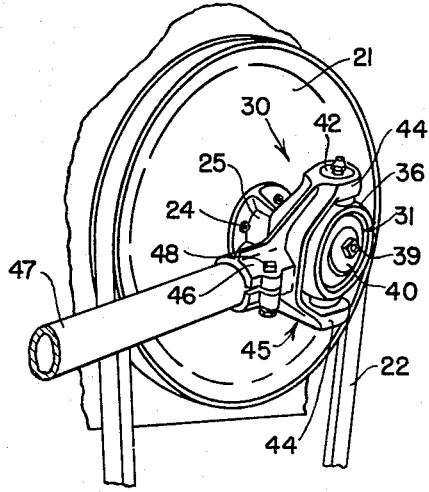
Figure 5 is a perspective view of the wobble plate device for reciprocating the transmission shaft about its major axis.

The ring 36 is provided with a pair of diametrically opposed radially extending trunnions 41, which are journaled in bearings 42 which are inserted in apertures 43 in the ends of a pair of arms 44 on a bifurcated yoke member 45, the latter having a socket 46 disposed on an axis perpendicular to the axis of the trunnions 41 and adapted to receive the rear end of a sickle driving shaft 47, which is clamped within the socket 46 by means of a clamping bolt 48 (see Figure 5). The inner bearing race 32 rotates with the pulley hub 25, while the outer race 35, ring 36, trunnions 41, and yoke 46 are held by the shaft 47 against rotation about the axis of the pulley 21. When the pulley 21 is rotated, the ring 36 and its connected parts are reciprocated with an angular movement about the longitudinal axis of the drive shaft 47 through an angle equal to twice the value of the acute angle between the plane of the bearing 31 and the plane perpendicular to the axis of rotation of the pulley hub 25.

Figure 2:
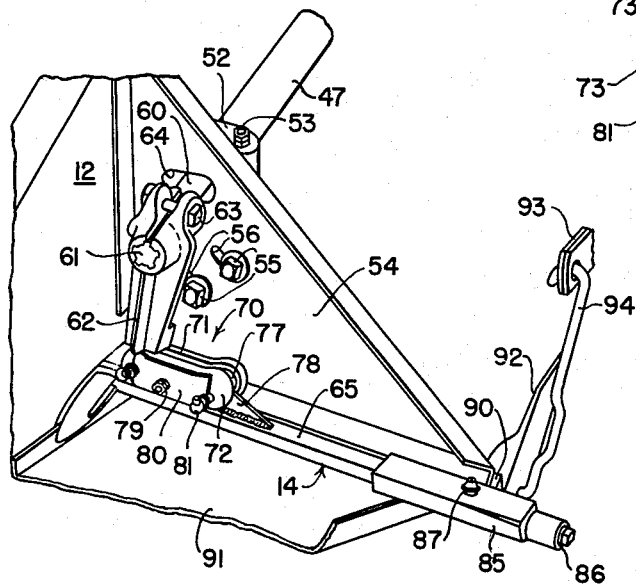
Figure 2 is a perspective view, drawn to an enlarged scale, of the lower end of the shaft which transmits power for driving the sickle, together with the connections between the shaft and the knife head.

The forward end of the shaft 47 is journaled in a bearing 50, which is carried on a bearing support 51. The bearing 50 is a self-aligning bearing of conventional type having a spherical outer surface which is cradled in the bearing support or pedestal 51 and is secured thereto by a cap 52 having a cooperative spherical seat, which engages the spherical bearing surface, the cap 52 being fastened to the support 51 by means of a bolt 53 on each side of the bearing. The bearing pedestal 51 is mounted on the rear side of a bracing wall 54, which extends outwardly from the side wall 12 of the platform and is disposed substantially perpendicular to the bottom of the platform. The pedestal 51 is supported on three bolts 55, which extend through bolt holes in the pedestal and through transversely extending slots 56 (see Figure 2) in the bracing wall 54. Thus when the bolts 55 are loose, the pedestal can be shifted laterally on the wall 54 for the purpose of adjusting the register of the sickle with respect to the cutter bar, as will be further explained later.

Figure 3:
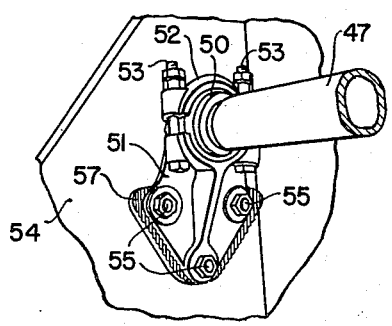
Figure 3 is a perspective view showing the bearing which supports the lower end of the power transmitting shaft.

In order to insure that the pedestal 51 is firmly locked in adjusted position, a corrugated plate 57 (see Figure 3) is interposed between the pedestal 51 and the wall 54. The plate 57 is rigidly fixed to the wall 54 by welding or by riveting and is provided with laterally extending slots disposed in register with the slots 56 in the wall 54. Similarly, the adjacent surface of the pedestal 51 is provided with corrugations (not shown) which interlock with the corrugations on the plate 57, thus firmly locking the pedestal to the supporting wall 54. The forward end of the shaft 47 is reduced in diameter, as indicated at 60, and has a splined end 61 to which is clamped a downwardly extending arm 62 by means of a clamping bolt 63. Thus, the arm 62 is disposed on the forward side of the wall 54 opposite the bearing 50, the shaft 60 extending through a transversely extending slot 64.

Figure 4:
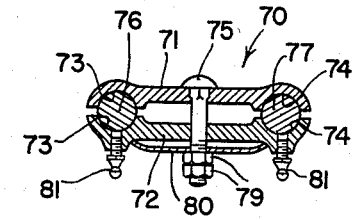
Figure 4 is a sectional plan view taken through the axis of the connecting link between the reciprocating arm and the knife head.

The lower end of the arm 62 is connected to the extended shank 65 of the sickle 14 by means of a double ball and socket joint device, indicated generally by the reference numeral 70 (see Figure 4), comprising a pair of clamping members 71, 72, each member having a substantially hemi-spherical ball socket 73, 74 at each end thereof, and the two members 71, 72 are clamped together by means of a bolt 75 disposed substantially at the center of the members. The lower end of the arm 62 is provided with a ball 76 which is received between the ball sockets 73 at one end of the interconnecting link 70, and another ball 77 is clamped between the ball socket 74 at the opposite end of the link 70. The ball 77 is rigidly supported, as by welding, on a vertically extending web 78, which is fixed to the sickle shank 65 by suitable means such as by welding. A pair of lock nuts 79 are threaded on the end of the bolt 75, and between the nuts 79 and the clamping member 72 is interposed a leaf spring 80, which insures a uniform pressure of the clamping members 71, 72 upon the balls 76, 77. Each of the ball joints is lubricated through a lubricating fitting 81, through which grease is applied under pressure by means of a suitable pressure gun.

The outer end of the sickle shank 65 is slidably supported within a tubular bearing housing 85, the outer end of the housing being closed by means of a plug 86, which is removable for cleanout purposes but is normally grease-tight to retain lubricating grease within the housing, the grease being applied under pressure through a suitable fitting 87. The tubular bearing housing 85 is rigidly supported on the outer end of an extension 90 of one of the transverse platform frame members as more particularly described in the aforementioned co-pending application. The frame member extension 90 also supports the outer end of the wall 54. A shoe or runner 91 is provided for protecting the sickle drive mechanism from obstructions such as stones, dirt and the like, and extends forwardly from the frame extension 90 and converges toward the point of the divider 17. A lifting bracket 92 is fixed to the outer end of the extension frame member 90, and the platform is raised and lowered about its pivot axis by means of suitable lifting mechanism including a lever 93 connected by a link 94 to the bracket 92.

During operation, the belt 22 drives the pulley 21, which rotates the hub 25 and inner ball race 32. The outer ball race 35 is held against rotation, but is oscillated from side to side, carrying with it the yoke 45 and the shaft 47, which is thereby oscillated about its longitudinal axis. The depending arm 62 at the forward end of the shaft 47 is thus oscillated toward and away from the platform wall 12 and by virtue of its connection with the sickle through the link member 70, the sickle is reciprocated relative to the cutter bar. The sickle can be adjusted relative to the cutter bar by loosening the bolts 55 and shifting the bearing pedestal 51 laterally until proper registry of the sickle knives with respect to the ledger plates of the cutter bar is obtained, after which the bolts 55 can be retightened in adjusted position. By tightening or loosening the nuts 79 on the bolt 75, the clamping pressure of the members 71, 72 upon the balls 76, 77 can be adjusted.

We claim:

1. In a harvesting machine, the combination of a cutter bar, a reciprocative sickle cooperative therewith, a reciprocative member connected to said sickle for actuating the latter, means for supporting said member on said machine in driving relation to said sickle, said supporting means being shiftable to adjust said sickle relative to said cutter bar, and means for fixing said supporting means on said machine in adjusted position.

2. In a harvesting machine, the combination of a cutter bar, a reciprocative sickle cooperative therewith, an arm having connection with said sickle for actuating the latter, means pivotally mounting said arm on said machine, said pivot means being shiftable generally parallel to the direction of movement of said sickle for adjusting the latter relative to said cutter bar, means for fixing said mounting means on said machine in adjusted position, and means for reciprocating said arm.

3. In a harvesting machine, the combination of a transversely extending cutter bar, a sickle slidable along said cutter bar, and means for reciprocating said sickle comprising an arm disposed generally perpendicular to and having connection with said sickle, means for pivotally mounting said arm on said machine, said mounting means being shiftable transversely of the machine to adjust the register of the sickle relative to said cutter bar, means for fixing said mounting means on said machine in adjusted position, a rotative power shaft journaled on said machine behind said cutter bar, a longitudinally disposed power transmitting shaft connected to said arm at its forward end, and means connecting the rear end of said shaft to said power shaft, and adapted to impart a reciprocative movement to said power transmitting shaft by rotation of said power shaft.

4. In a harvesting machine, the combination of a transversely extending cutter bar, a sickle slidable along said cutter bar, and means for reciprocating said sickle comprising a generally vertically disposed arm, means connecting the lower end of said arm with the sickle, means pivotally supporting said arm on said machine above said sickle for swinging movement about a generally for and aft extending axis, said pivot support being shiftable transversely to adjust the register of said sickle, means for fixing said pivot support on said machine in adjusted position, and means for reciprocating said arm.

5. In a harvesting machine, the combination of a transversely extending cutter bar, a sickle slidable along said cutter bar, and means for reciprocating said sickle comprising a generally vertically disposed arm, means connecting the lower end of said arm with the sickle, a rearwardly extending shaft to which the upper part of said arm is fixed, a supporting bearing for said shaft adjacent said arm, a supporting frame member on said machine, means for adjustably fixing said bearing to said member in any of several transversely spaced positions for adjusting the register of said sickle relative to said cutter bar, and means for angularly reciprocating said shaft about its major axis.

6. In a harvesting machine, the combination of a transversely extending cutter bar, a sickle slidable along said cutter bar, and means for reciprocating said sickle comprising a generally vertically disposed arm, means connecting the lower end of said arm with the sickle comprising a ball fixed on said sickle, a ball on the end of said arm, and a link connecting said balls comprising a pair of opposed clamping members, each having a ball socket at each end thereof and a bolt interconnecting said clamping members intermediate the ends thereof, a rearwardly extending shaft to which the upper part of said arm is fixed, a supporting bearing for said shaft adjacent said arm, a supporting frame member on said machine, means for adjustably fixing said bearing to said member in any of several transversely spaced positions for adjusting the register of said sickle relative to said cutter bar, and means for angularly reciprocating said shaft about its major axis.

7. In a harvesting machine, a platform having a cutter bar, a sickle slidably disposed on said cutter bar and having a shank extending beyond the latter at one end thereof, a tubular bearing housing slidably receiving the end of said shank in one end thereof, the opposite end of said housing being closed to retain lubricating material therein, and mechanism for reciprocating said sickle connected to said shank between said housing and said cutter bar.

LOUIS A. PARADISE.
RALPH L. ANDERSON.